United States Patent
Yamauchi et al.

(10) Patent No.: US 10,843,738 B2
(45) Date of Patent: Nov. 24, 2020

(54) FRONT VEHICLE-BODY STRUCTURE OF VEHICLE

(71) Applicant: MAZDA MOTOR CORPORATION, Hiroshima (JP)

(72) Inventors: Kazuki Yamauchi, Aki-gun (JP); Hidenori Matsuoka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 120 days.

(21) Appl. No.: 16/296,032

(22) Filed: Mar. 7, 2019

(65) Prior Publication Data
US 2019/0300065 A1  Oct. 3, 2019

(30) Foreign Application Priority Data

Mar. 27, 2018 (JP) ................... 2018-059477

(51) Int. Cl.
| B60J 7/00 | (2006.01) |
| B62D 25/08 | (2006.01) |
| B62D 21/11 | (2006.01) |
| B62D 25/04 | (2006.01) |
| B62D 25/14 | (2006.01) |

(52) U.S. Cl.
CPC ............ *B62D 25/088* (2013.01); *B62D 21/11* (2013.01); *B62D 25/04* (2013.01); *B62D 25/081* (2013.01); *B62D 25/14* (2013.01)

(58) Field of Classification Search
CPC . Y10T 74/20528; B60T 7/065; B62D 25/082; B62D 25/14; B62D 25/2018; B62D 1/28; B60P 3/08; G07B 15/063; G01S 13/931; G01C 21/28
See application file for complete search history.

(56) References Cited

U.S. PATENT DOCUMENTS

| 4,542,934 A | * | 9/1985 | Komatsu | B62D 25/082 296/198 |
| 5,387,023 A | * | 2/1995 | Deneau | B60K 37/00 296/187.12 |
| 5,564,769 A | * | 10/1996 | Deneau | B62D 21/15 180/90 |
| 5,868,426 A | * | 2/1999 | Edwards | B62D 25/147 180/90 |

(Continued)

FOREIGN PATENT DOCUMENTS

JP    2017-171102 A    9/2017

*Primary Examiner* — Kiran B Patel
(74) *Attorney, Agent, or Firm* — Studebaker & Brackett PC

(57) ABSTRACT

A front vehicle-body structure of a vehicle, comprising a dash panel constituting a partition wall which is positioned at a front side of a cabin portion of the vehicle, a pair of right-and-left hinge pillars connected to both ends of the dash panel and extending in a vehicle vertical direction, an instrument panel member interconnecting the hinge pillars in a vehicle width direction in the cabin portion, a suspension tower provided to be spaced forwardly apart from the dash panel and supporting an upper end of a front suspension damper, a heat-insulating inner upper portion connecting the suspension tower and the dash panel, and an instrument-panel connecting member connecting a portion of the dash panel which is positioned in the vicinity of a rear end of the heat-insulating inner upper portion and the instrument panel member.

12 Claims, 9 Drawing Sheets

(56) References Cited

U.S. PATENT DOCUMENTS

| | | | | |
|---|---|---|---|---|
| 6,110,037 A * | 8/2000 | Yoshinaka | | B60H 1/0055 |
| | | | | 454/143 |
| 6,447,041 B1 * | 9/2002 | Vandersluis | | B60H 1/0055 |
| | | | | 296/203.02 |
| 6,560,872 B2 * | 5/2003 | Morrison | | B62D 25/145 |
| | | | | 29/458 |
| 6,769,733 B2 * | 8/2004 | Seksaria | | B60K 5/12 |
| | | | | 296/192 |
| 6,851,742 B1 * | 2/2005 | Kubiak | | B62D 25/145 |
| | | | | 296/193.02 |
| 6,893,065 B2 * | 5/2005 | Seksaria | | B60K 5/12 |
| | | | | 293/133 |
| 7,237,831 B2 * | 7/2007 | Yamamoto | | B62D 25/147 |
| | | | | 296/193.04 |
| 7,390,047 B2 * | 6/2008 | Hanakawa | | B62D 25/081 |
| | | | | 296/203.02 |
| 8,979,104 B2 * | 3/2015 | Niwa | | B62D 25/025 |
| | | | | 280/124.145 |
| 9,283,995 B2 * | 3/2016 | Hisazumi | | B62D 25/081 |
| 9,446,800 B2 * | 9/2016 | Davos | | B62D 29/001 |
| 9,688,309 B2 * | 6/2017 | Goto | | B62D 21/11 |
| 9,725,122 B2 * | 8/2017 | Kim | | B60R 19/24 |
| 9,988,088 B2 * | 6/2018 | Lee | | B62D 21/152 |
| 9,988,100 B2 * | 6/2018 | Kim | | B62D 25/082 |
| 10,071,769 B2 * | 9/2018 | Kim | | B62D 25/088 |
| 10,086,881 B2 * | 10/2018 | Kim | | B62D 25/082 |
| 10,144,456 B1 * | 12/2018 | Ciccone | | B62D 25/088 |
| 10,232,881 B2 * | 3/2019 | Saito | | B62D 21/11 |
| 10,494,028 B2 * | 12/2019 | Madasamy | | B62D 25/082 |
| 10,618,567 B2 * | 4/2020 | Guariento | | B62D 25/082 |
| 2003/0034672 A1 * | 2/2003 | Nagy | | B62D 25/145 |
| | | | | 296/203.02 |
| 2007/0215402 A1 * | 9/2007 | Sasaki | | B62D 25/088 |
| | | | | 180/232 |
| 2008/0150326 A1 * | 6/2008 | Maruyama | | B62D 21/152 |
| | | | | 296/192 |
| 2008/0265623 A1 * | 10/2008 | Kiyotake | | B62D 25/081 |
| | | | | 296/187.09 |
| 2013/0161978 A1 * | 6/2013 | Herntier | | B62D 25/082 |
| | | | | 296/193.09 |
| 2013/0221708 A1 * | 8/2013 | Hanakawa | | B62D 25/088 |
| | | | | 296/193.09 |
| 2015/0076867 A1 * | 3/2015 | Bechtler | | B62D 25/088 |
| | | | | 296/203.02 |
| 2016/0031484 A1 * | 2/2016 | Nakauchi | | B60R 19/24 |
| | | | | 296/187.09 |
| 2016/0031485 A1 * | 2/2016 | Nakauchi | | B62D 25/085 |
| | | | | 296/203.02 |
| 2016/0221608 A1 * | 8/2016 | Hiramatsu | | B62D 21/152 |
| 2016/0288839 A1 * | 10/2016 | Fukuoka | | B62D 25/082 |
| 2017/0203794 A1 * | 7/2017 | Nakamura | | B62D 25/04 |
| 2017/0313360 A1 * | 11/2017 | An | | B62D 25/082 |
| 2018/0029643 A1 * | 2/2018 | Maruyama | | B62D 21/11 |
| 2018/0029649 A1 * | 2/2018 | Maruyama | | B62D 25/088 |
| 2018/0244315 A1 * | 8/2018 | Nakamura | | B62D 25/025 |
| 2019/0300055 A1 * | 10/2019 | Yamauchi | | B62D 21/152 |
| 2019/0300056 A1 * | 10/2019 | Yamauchi | | B62D 25/145 |
| 2020/0062309 A1 * | 2/2020 | Watanabe | | B62D 21/11 |
| 2020/0062313 A1 * | 2/2020 | Tashiro | | B62D 25/085 |
| 2020/0062315 A1 * | 2/2020 | Matsuoka | | B62D 25/088 |

\* cited by examiner

FRONT VEHICLE-BODY STRUCTURE OF VEHICLE

BACKGROUND OF THE INVENTION

The present invention relates to a front vehicle-body structure of a vehicle which comprises a connecting member which connects a suspension tower and a dash panel at a vehicle front portion, for example.

In a vehicle, such as an automotive vehicle, a front suspension damper which expands and contracts in accordance with unevenness of a road surface to suppress a vertical move of a vehicle body, thereby ensuring the ride quality for passengers, is connected to a skeleton member of the vehicle body via the suspension tower, for example.

In general, since relatively-large load energy acts on the suspension tower through the front suspension damper, the suspension tower may have deflection (bending) deformation which is caused by this load energy. There was a concern that this deflection deformation of the suspension tower might deteriorate the handling stability of the vehicle or increase vibrations and noises transmitted into a cabin of the vehicle.

Accordingly, a vehicle-body structure of a vehicle which improves the rigidity of the suspension tower by means of a connecting member which is connected to the suspension tower at its one end is known. Japanese Patent Laid-Open Publication No. 2017-171102, for example, discloses a vehicle-body structure in which a pair of right-and-left reinforcing members (16) which respectively connect a pair of right-and-left suspension towers (7) supporting respective front suspension dampers (shock absorbers) and a dash cross member (11) provided at a front face of a dash panel (6) are provided at a front vehicle body.

According to the above-described vehicle-body structure disclosed in the patent document, the rigidity of the suspension tower (7) can be improved and the load energy acting on the suspension tower can be dispersed and transmitted to the front vehicle body by way of the reinforcing members (16), thereby ensuring the rigidity between the right-and-left suspension towers (7).

However, since the load energy acting on the suspension tower is mainly dispersed and transmitted to the front vehicle body in the above-described vehicle-body structure of the patent document, there is a concern that a difference between load energy acting on the front vehicle body and load energy acting on a rear vehicle body becomes so large that passengers of this vehicle may have a sense of discomfort, such as feeling of a twist of the vehicle body. Thus, there is room for improvement in transmission of the load energy acting on the suspension tower in the above-described vehicle-body structure of the patent document.

SUMMARY OF THE INVENTION

The present invention has been devised in view of the above-described matters, and an object of the present invention is to provide a front vehicle-body structure of a vehicle which can efficiently disperse and transmit the load energy acting on the suspension tower to a whole part of the vehicle body.

The present invention is a front vehicle-body structure of a vehicle which comprises a dash panel constituting a partition wall which is positioned at a front side of a cabin portion of the vehicle, a pair of right-and-left hinge pillars connected to both ends of the dash panel and extending in a vehicle vertical direction, an instrument panel member interconnecting the right-and-left hinge pillars in a vehicle width direction in the cabin portion, a suspension tower provided to be spaced forwardly apart from the dash panel and supporting an upper end of a front suspension damper, a first connecting member connecting the suspension tower and the dash panel, and a second connecting member connecting a portion of the dash panel which is positioned in the vicinity of a rear end of the first connecting member and the instrument panel member.

According to the present invention, the load energy acting on the suspension towers can be efficiently dispersed and transmitted to the whole part of the vehicle body of the vehicle. Specifically, since the suspension towers and the dash panel are connected via the first connecting members, the front vehicle-body structure of the vehicle can create load-energy transmission paths extending from the suspension towers to the right-and-left hinge pillars by way of the first connecting members and the dash panel at the front vehicle body.

Further, since the rear ends of the first connecting members and the instrument panel member are connected via the dash panel and the second connecting members, the front vehicle-body structure of the vehicle can create load-energy transmission paths extending from the suspension towers to the right-and-left hinge pillars by way of the first connecting members, the second connecting members, and the instrument panel member at the front vehicle body.

Accordingly, the front vehicle-body structure of the vehicle can disperse and transmit the load energy acting on the suspension towers to the right-and-left hinge pillars through the load-energy transmission paths extending by way of the dash panel and the load-energy transmission paths extending by way of the instrument panel member.

Thereby, the front vehicle-body structure of the vehicle can efficiently disperse and transmit the load energy acting on the suspension towers from the right-and-left hinge pillars to a rear vehicle body by way of front pillars and side sills. Thus, the front vehicle-body structure of the vehicle can efficiently disperse and transmit the load energy acting on the suspension towers to the whole part of the vehicle body of the vehicle by means of the first connecting members and the second connecting members.

In an embodiment of the present invention, the rear end of the first connecting member is connected to the dash panel at a position which is located on an inward side, in the vehicle width direction, of the suspension tower.

According to this embodiment, the front vehicle-body structure of the vehicle can aggressively transmit the load energy acting on one of the suspension towers to the hinge pillar which is positioned on the side of the other suspension tower, compared to a case where the suspension towers and the dash panel are connected by the first connecting members which are configured to extend substantially linearly along the vehicle longitudinal direction.

Thereby, the front vehicle-body structure of the vehicle can efficiently disperse and transmit the load energy acting on the suspension tower to a part of the rear vehicle body which is diagonally positioned to this suspension tower where the load energy acts. Thus, the front vehicle-body structure of the vehicle can more efficiently disperse and transmit the load energy acting on the suspension towers to the whole part of the vehicle body of the vehicle by means of the first connecting members which are connected to the dash panel at respective positions which are located on the inward side, in the vehicle width direction, of the suspension towers.

In another embodiment of the present invention, the front vehicle-body structure further comprises a cowl box which is connected to an upper end of the dash panel and interconnects the right-and-left hinge pillars, wherein the first connecting member and the second connecting member are connected to the dash panel via the cowl box.

Herein, the above-described cowl box includes any type of boxy member which is configured to have a closed cross section which extends in the vehicle width direction or an open cross section where a part of the cross section is opened and which extends in the vehicle width direction.

According to this embodiment, the front vehicle-body structure of the vehicle can ensure the rigidity of the dash panel by means of the cowl box, and create the load-energy transmission paths extending from the suspension towers to the right-and-left hinge pillars by way of the first connecting members and the cowl box.

Accordingly, the front vehicle-body structure of the vehicle can disperse and transmit the load energy acting on the suspension towers to the hinge pillars through the load-energy transmission paths extending by way of the dash panel and the load-energy transmission paths extending by way of the instrument panel member.

Thereby, the front vehicle-body structure of the vehicle can more efficiently disperse and transmit the load energy acting on the suspension towers from the right-and-left hinge pillars to the rear vehicle body by way of the front pillars and the side sills.

Thus, the front vehicle-body structure of the vehicle can efficiently disperse and transmit the load energy acting on the suspension tower to the whole part of the vehicle body of the vehicle by means of the first connecting member and the second connecting member which are connected to the dash panel via the cowl box.

In another embodiment of the present invention, the cowl box is configured to have a closed cross section or an open cross section which extend in the vehicle width direction, and the front vehicle-body structure further comprises a third connecting member which connects a pair of inner faces of the cowl box which are provided to face in a vehicle longitudinal direction substantially at the same position, in the vehicle width direction, as the rear end of the first connecting member and a front end of the second connecting member.

According to this embodiment, the front vehicle-body structure of the vehicle can improve the efficiency of the load-energy transmission from the first connecting member to the second connecting member by way of the cowl box, compared to a case where the third connecting member is not provided. Thus, the front vehicle-body structure of the vehicle can more efficiently disperse and transmit the load energy acting on the suspension tower to the whole part of the vehicle body of the vehicle.

In another embodiment of the present invention, the first connecting member is a member which creates a heat insulating space between the suspension tower and the dash panel.

Herein, the above-described heat insulating space is formed in front of the dash panel for heat retaining and heat insulating, which is a space capable of storing onboard components or auxiliary devices therein.

According to this embodiment, the front vehicle-body structure of the vehicle can integrate the heat-insulating performance and the performance of transmitting the load energy acting on the suspension tower to the dash panel on the first connecting member. Thereby, the front vehicle-body structure of the vehicle can suppress an increase of the number of parts at the front vehicle body, compared to a case where a member creating the heat-insulating space is provided separately from the first connecting member, and also it can be prevented that a layout space for an engine, for example, is suppressed by the above-described separately-provided member creating the heat-insulating space.

Thus, the front vehicle-body structure of the vehicle can efficiently disperse and transmit the load energy acting on the suspension tower to the whole part of the vehicle body of the vehicle and also easily create the heat-insulating space, suppressing a weight increase.

Other features, aspects, and advantages of the present invention will become apparent from the following description which refers to the accompanying drawings.

DETAILED DESCRIPTION OF THE INVENTION

Figure 3:
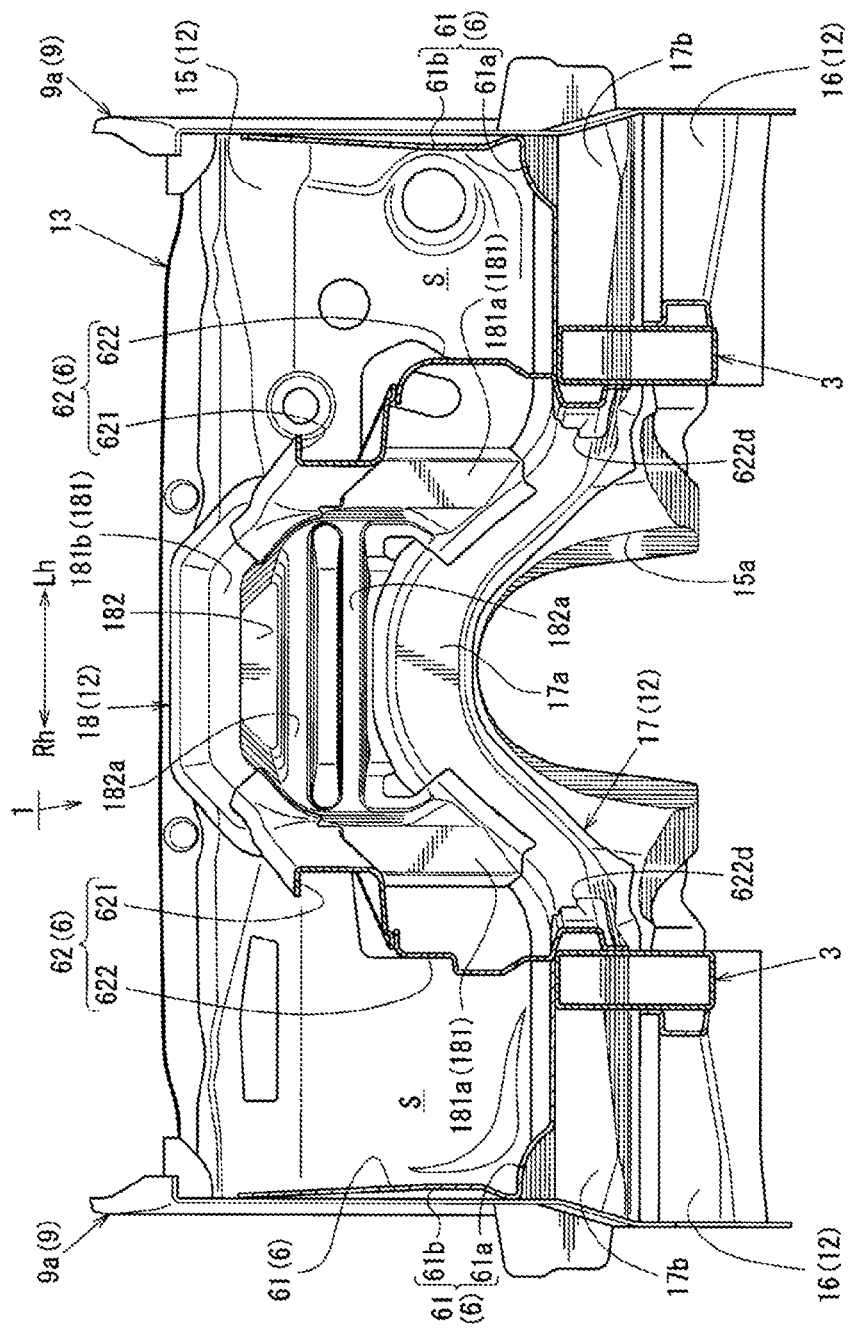
FIG. 3 is a sectional view taken along line A-A of FIG. 1.
Figure 4:
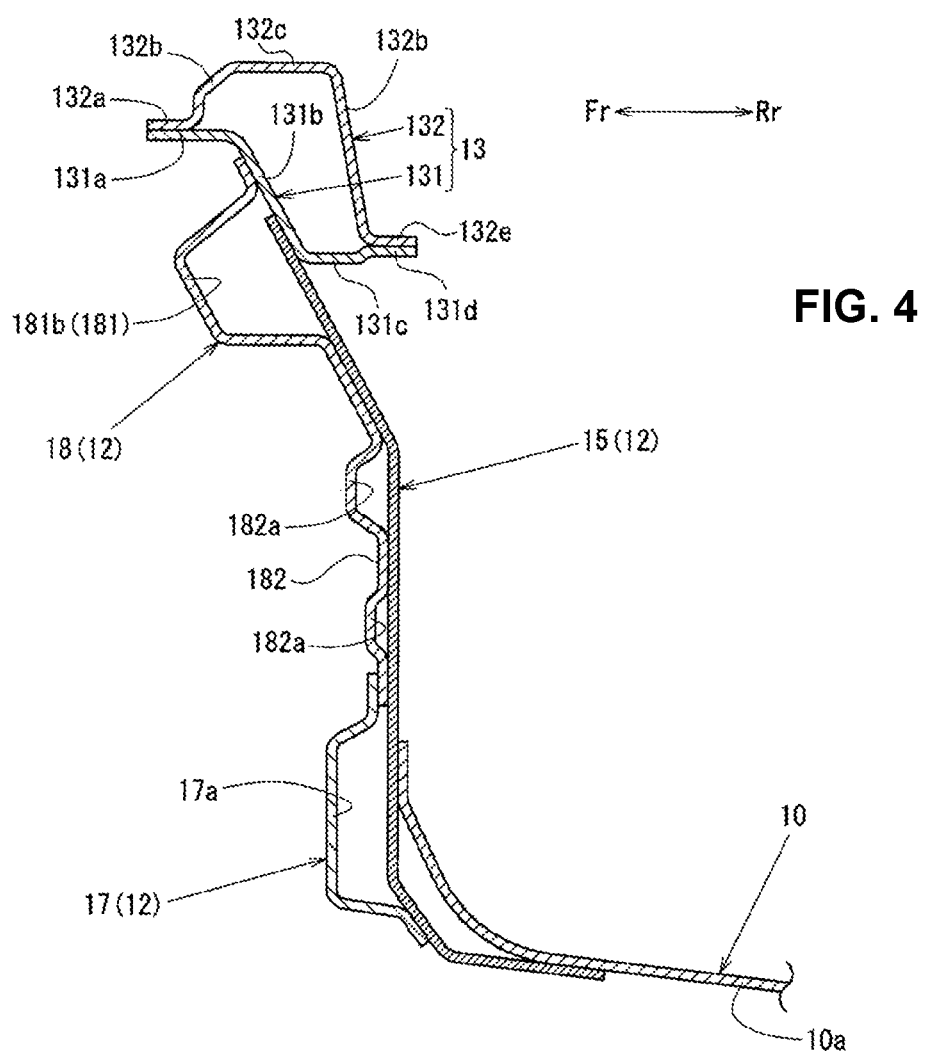
FIG. 4 is a sectional view taken along line B-B of a major part of FIG. 1.
Figure 5:
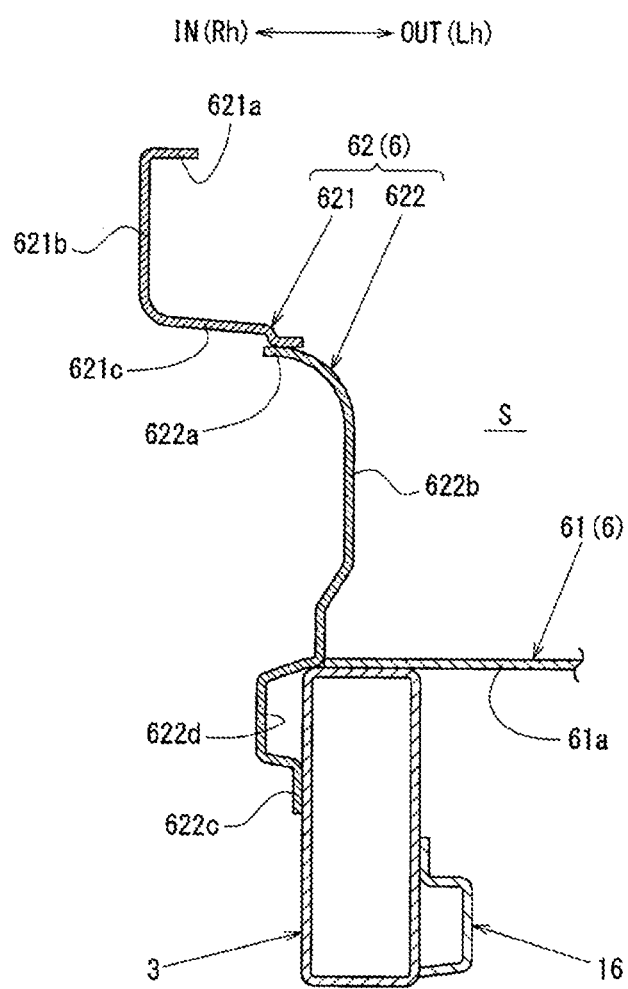
FIG. 5 is a sectional view taken along line A-A of a left-side major part of the vehicle.
Figure 6:
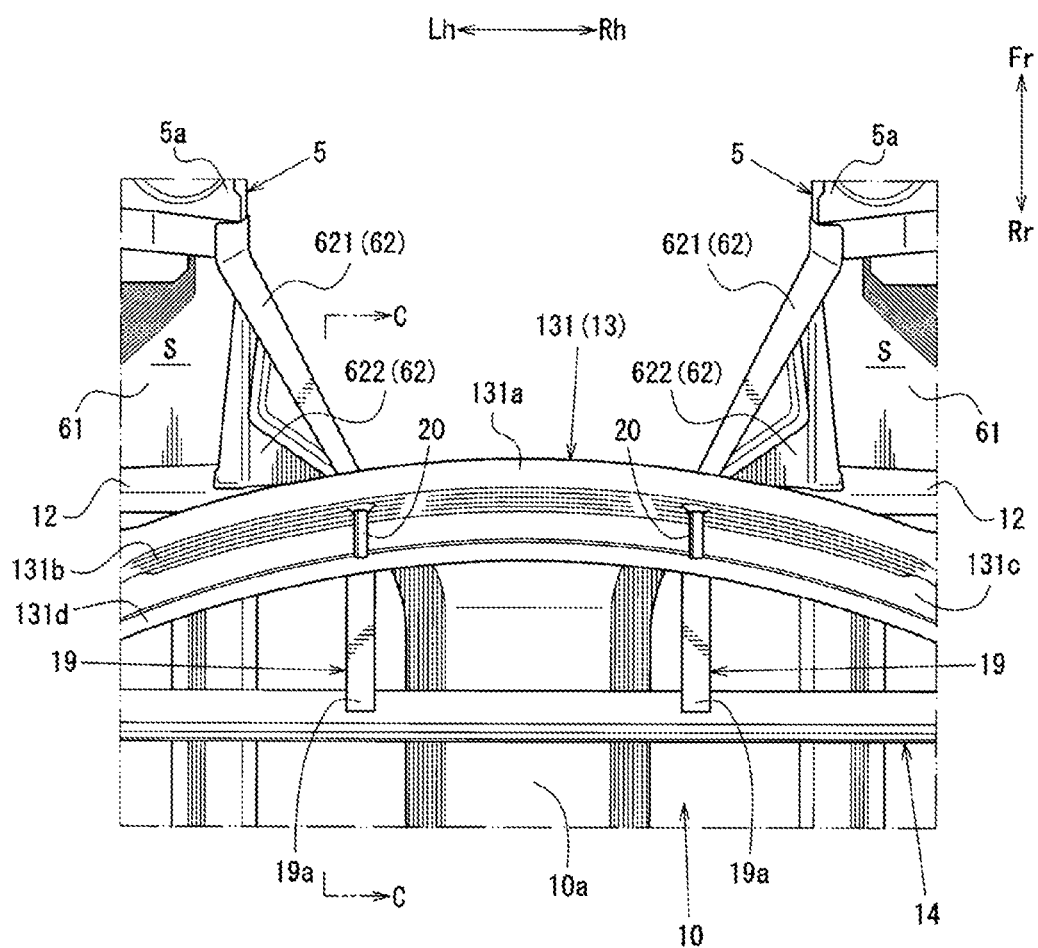
FIG. 6 is a plan view showing an external appearance of a major part of the front vehicle body of the vehicle.
Figure 7:
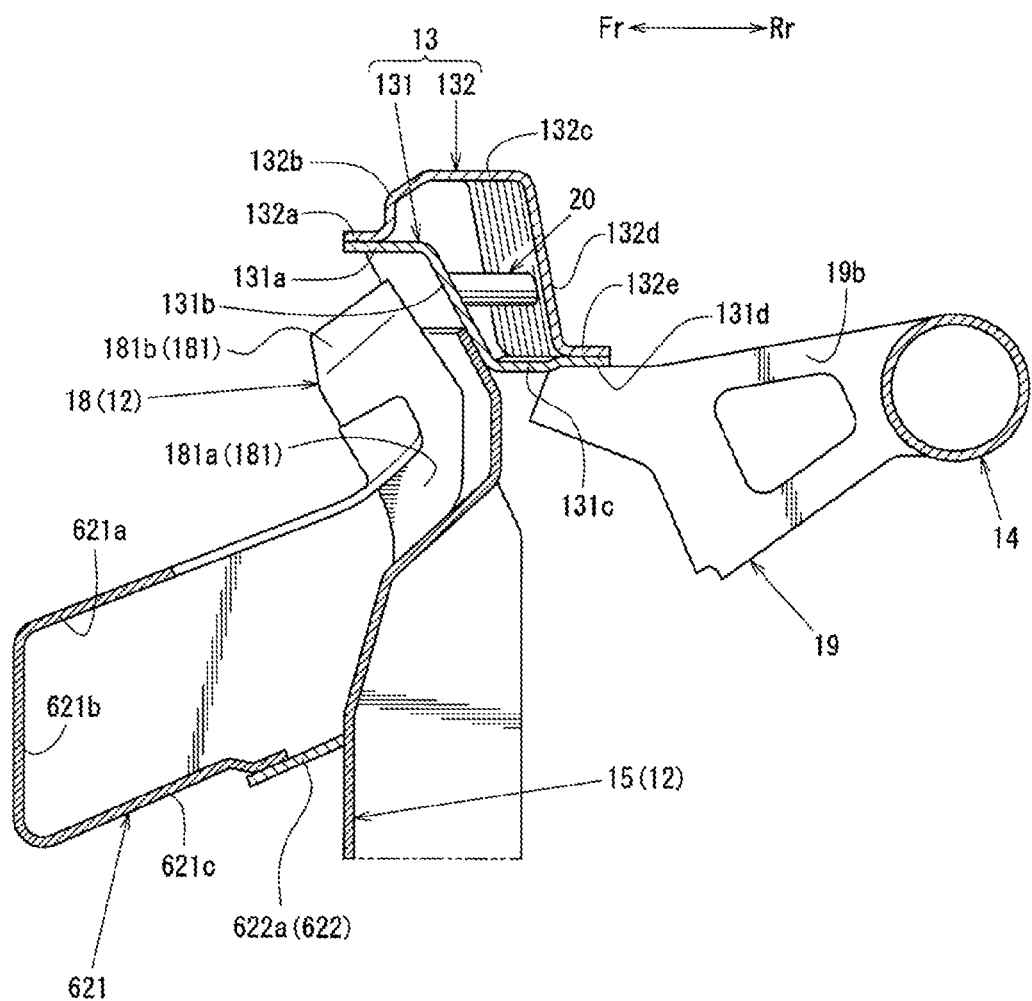
FIG. 7 is a sectional view taken along line C-C of a major part of FIG. 6.

Hereafter, an embodiment of the present invention will be described referring to the drawings. Herein, FIG. 1 is a plan view showing an external appearance of a front vehicle body of a vehicle 1, FIG. 2 is a perspective view showing the external appearance of the front vehicle body of the vehicle 1, when viewed from an upper-front side of the vehicle, FIG. 3 is a sectional view taken along line A-A of FIG. 1, FIG. 4 is a sectional view taken along line B-B of a major part of FIG. 1, FIG. 5 is a sectional view taken along line A-A of a left-side major part of the vehicle 1, FIG. 6 is a plan view showing an external appearance of a major part of the front vehicle body of the vehicle 1, and FIG. 7 is a sectional view taken along line C-C of a major part of FIG. 6.

Figure 2:
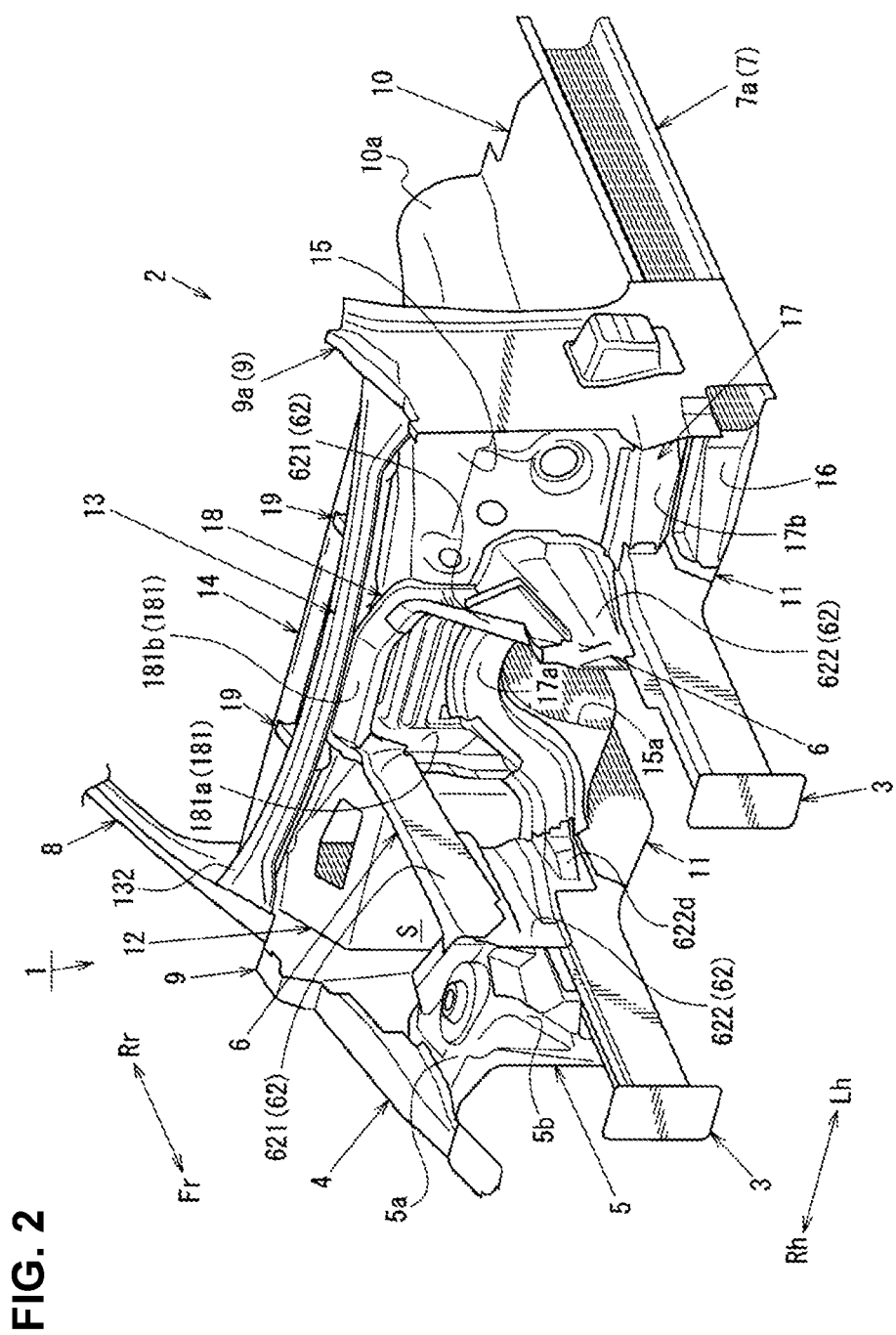
FIG. 2 is a perspective view showing the external appearance of the front vehicle body of the vehicle, when viewed from an upper-front side of the vehicle.

In FIG. 2, illustrating of a side sill outer of a side sill 7 and a hinge pillar outer of a hinge pillar 9 which are respectively positioned on a vehicle left side is omitted, and illustrating of a front pillar 8, a suspension tower 5, an apron reinforcement 4, and a heat-insulating member upper 61 which are respectively positioned on the vehicle left side is omitted, which are made for clarifying illustrating of the figure. Further, illustrating of a cowl upper 132 of a cowl box 13 is omitted in FIG. 6 for clarification of figure illustration as well.

In the figures, arrows Fr, Rr show a longitudinal direction, wherein the arrow Fr shows a forward side and the arrow Rr shows a rearward side. Further, arrows Rh, Lh show a width direction, wherein the arrow Rh shows a rightward side and the arrow Lh shows a leftward side. Additionally, an arrow IN shows an inward side in a vehicle width direction and an arrow OUT shows an outward side in the vehicle width direction.

Figure 1:
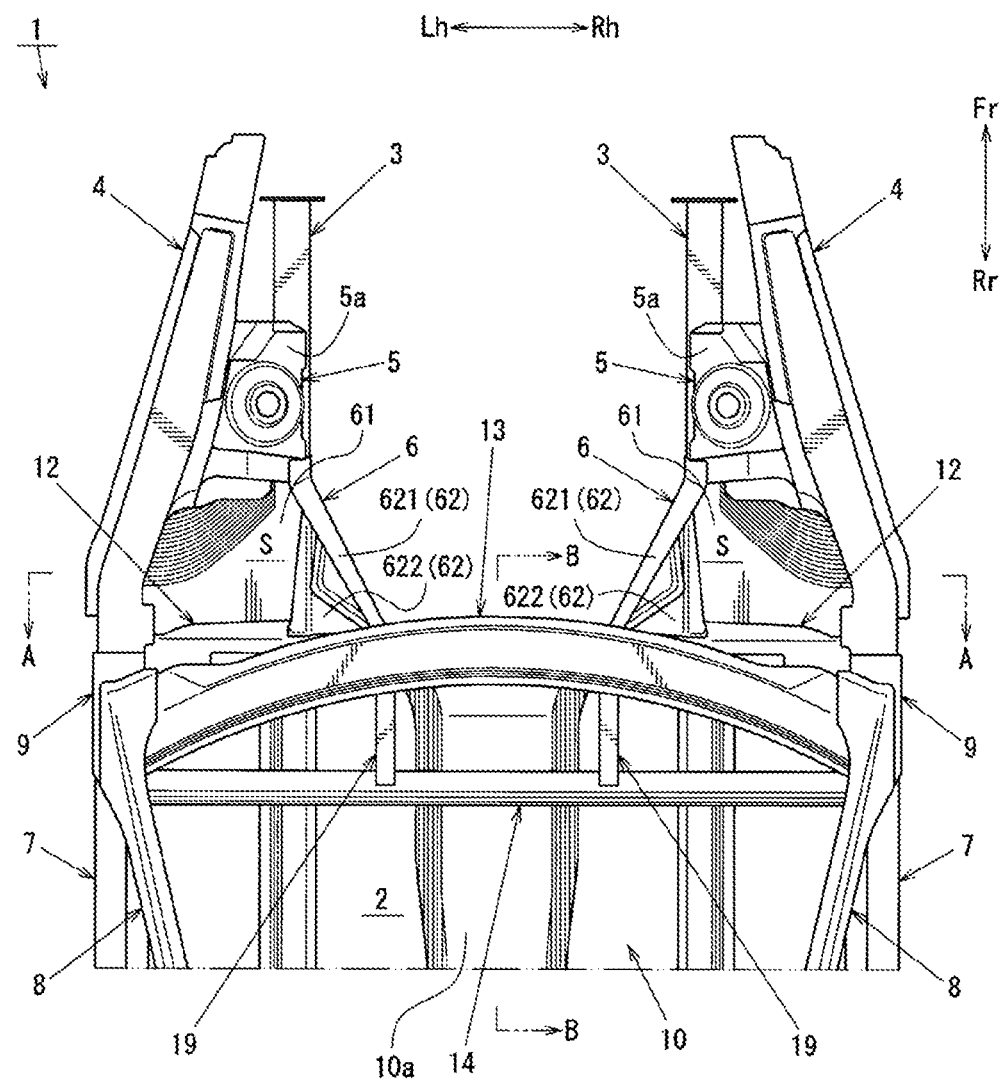
FIG. 1 is a plan view showing an external appearance of a front vehicle body of a vehicle.

A vehicle-body structure of the vehicle 1 according to the present embodiment comprises, as shown in FIGS. 1 and 2, a cabin portion 2, a pair of right-and-left front side frames 3, a pair of right-and-left apron reinforcements 4, a pair of right-and-left suspension towers 5, and a pair of right-and-left heat-insulating members 6.

As shown in FIGS. 1 and 2, the cabin portion 2 comprises a pair of right-and-left side sills 7 which extend in a vehicle longitudinal direction, being spaced apart from each other in the vehicle width direction, a pair of right-and-left front pillars 8 which are arranged above the side sills 7, hinge pillars 9 which connect respective front ends of the side sills 7 and respective front ends of the front pillars 8 in a vehicle vertical direction, a floor panel 10 which constitutes a floor face of the cabin portion 2 between the right-and-left side sills 7, a pair of right-and-left floor frames 11 which extend in the vehicle longitudinal direction at a lower face of the floor panel 10, a dash panel 12 and a cowl box 13 which constitute a front wall of the cabin portion 2, and an instrument panel member 14 which interconnects the right-and-left hinge pillars 9.

Each of the right-and-left side sills 7 comprises a side sill inner 7a which is arranged on the inward side in the vehicle width direction and a side sill outer which is arranged on the outward side, in the vehicle width direction, of the side sill inner 7a, which form a closed cross section of the side sill 7 extending in the vehicle longitudinal direction, specific illustration of which is omitted.

For example, as shown in FIG. 2, the closed cross section of the side sill 7 is formed by the side sill inner 7a which is configured to protrude inward in the vehicle width direction so as to have a roughly hat-shaped cross section and the side sill outer which is configured to protrude outward in the vehicle width direction so as to have a roughly hat-shaped cross section, which are contacted and joined together in the vehicle width direction.

Further, each of the right-and-left front pillars 8 comprises a front pillar inner which is positioned on the inward side in the vehicle width direction and a front pillar outer which is positioned on the outward side, in the vehicle width direction, of the front pillar inner, which form a closed cross section of the front pillar 8 extending substantially in the vehicle vertical direction, specific illustration of which is omitted. As shown in FIGS. 1 and 2, the front pillar 8 is configured such that its rear end is positioned on an upper-rear side of its front end.

For example, the closed cross section of the front pillar 8 is formed by the front pillar inner which is configured to protrude inward in the vehicle width direction so as to have a roughly hat-shaped cross section and the front pillar outer which is configured to protrude outward in the vehicle width direction so as to have a roughly hat-shaped cross section, which are contacted and joined together in the vehicle width direction.

Moreover, each of the right-and-left hinge pillars 9 comprises a hinge pillar inner 9a which is positioned on the inward side in the vehicle width direction and a hinge pillar outer which is positioned on the outward side, in the vehicle width direction, of the hinge pillar inner 9a, which form a closed cross section of the hinge pillar 9 extending substantially in the vehicle vertical direction, specific illustration of which is omitted.

For example, as shown in FIG. 2, the closed cross section of the hinge pillar 9 is formed by the hinge pillar inner 9a which is of a roughly flat-plate shape and the hinge pillar outer which is configured to protrude outward in the vehicle width direction so as to have a roughly hat-shaped cross section, which are contacted and joined together in the vehicle width direction. Herein, as shown in FIG. 2, the hinge pillar inner 9a is configured such that its front edge is positioned on a forward side, in the vehicle longitudinal direction, of a front end of the side sill 7 and the dash panel 12, which will be described later.

Further, as shown in FIGS. 1 and 2, the floor panel 10 is a panel member which interconnects the right-and-left side sills 7 so as to form the floor face of the cabin portion 2. A central part, in the vehicle width direction, of the floor panel 10 is configured to protrude upwardly so as to form a floor tunnel 10a which extends in the vehicle longitudinal direction. A front edge of the floor panel 10 is joined to the dash panel 12 (a dash panel body 15 which will be described later).

The right-and-left floor frames 11 are respectively arranged between the right-and-left side sills 7 and the floor tunnel 10a as shown in FIG. 2. The floor frame 11 is configured to protrude downwardly so as to have a roughly hat-shaped cross section, and joined to a lower face of the floor panel 10 so as to form a closed cross section which extends substantially in the vehicle longitudinal direction.

As shown in FIGS. 2 through 4, the dash panel 12 comprises a dash panel body 15 which forms a front wall of the cabin portion 2 and a pair of right-and-left torque boxes 16, a dash cross member 17 and a dash-panel reinforcing member 18 which are joined to a front face of the dash panel body 15.

The dash panel member 15 is, as shown in FIGS. 2 through 4, a member which has a specified thickness in the vehicle longitudinal direction, and joined to the right-and-left hinge pillars 9 at both ends, in the vehicle width direction, thereof. Further, the dash panel 12 is joined to a lower face of a front end of the floor panel 10 at its lower end which is bent rearwardly.

Herein, as shown in FIG. 3, a lower end of a roughly central part, in the vehicle width direction, of the dash panel body 15 is configured, in an elevational view, to protrude upwardly in a roughly inverse-U shape and match a shape of the floor tunnel 10a of the floor panel 10, which is called a tunnel-matching portion 15a.

As shown in FIG. 3, the torque box 16 is joined to a front face of a lower portion of the dash panel body 15, and connects the front end of the side sill 7 and an outward side face, in the vehicle width direction, of the floor frame 11.

More specifically, the torque box 16 is, as shown in FIGS. 3 and 5, formed in a roughly boxy shape by the front end of the side sill 7, the front face of the lower portion of the dash panel 12 which is positioned inwardly adjacently to the side sill 7, and a side face of a portion of the front frame 11 which is positioned in the vicinity of a front end of the floor frame 11 such that the torque box 16 has a closed cross section in a horizontal plane along the vehicle longitudinal direction.

The dash cross member 17 is, as shown in FIGS. 2 through 4, joined to a front face of a lower portion of the dash panel body 15 which is positioned above the torque box 16, and interconnects the respective hinge pillar inners 9a of the right-and-left hinge pillars 9 in the vehicle width direction.

As shown in FIGS. 2 through 4, the dash cross member 17 is configured such that its roughly hat-shaped open cross section which protrudes forwardly extends along the front face of the lower portion of the dash panel body 15. Accordingly, the dash cross member 17 forms a closed cross section substantially extending in the vehicle width direction together with the front face of the lower portion of the dash panel body 15.

More specifically, the dash cross member 17 comprises, as shown in FIG. 3, a main gate-shaped portion 17a which is configured in a roughly gate shape, in the elevational view, to match a shape of the tunnel-matching portion 15a of the dash panel body 15 and a pair of right-and-left member horizontal portions 17b which extend inwardly in the vehicle width direction toward the right-and-left hinge pillar inners 9a from a lower end of the member gate-shaped portion 17a, which are integrally formed.

As shown in FIGS. 2 and 3, the dash-panel reinforcing member 18 is arranged at a front face of the dash panel body 15 which is positioned above the member gate-shaped portion 17a of the dash cross member 17, joined to the dash cross member 17 at its lower end, and joined to the cowl box 13, which will be described later, at its upper end.

The dash-panel reinforcing member 18 comprises, as shown in FIGS. 2 and 3, a reinforcing member body 181 which is configured in a roughly gate shape, in the elevational view, to be opened downwardly and a flat-plate portion 182 which is configured in a roughly flat-plate shape to cover a portion enclosed by the reinforcing member body 181, which are integrally formed. As shown in FIGS. 3 and 4, the reinforcing member body 181 is configured such that its roughly hat-shaped open cross section which protrudes forwardly extends in the roughly gate shape in the elevational view.

More specifically, as shown in FIG. 3, the reinforcing member body 181 comprises a pair of leg portions 181a which are spaced apart from each other in the vehicle width direction and respectively extend in the vehicle vertical direction, interposing a top portion of the member gate-shaped portion 17a therebetween and a bridge portion 181b which interconnects respective upper ends of the leg portions 181a in the vehicle width direction, which are integrally formed in the roughly gate shape in the elevational view.

As shown in FIG. 3, respective lower ends of the leg portions 181a of the reinforcing-member body 181 are joined to respective portions of the member gate-shaped portion 17a of the dash cross member 17 which are positioned on the outward side, in the vehicle width direction, of the top portion of the member gate-shaped portion 17a such that the leg portions 181a are joined to a front face of the dash panel 12 over a range from the lower ends of the leg portions 181a to the upper ends of the leg portions 181a. Meanwhile, the bridge portion 181b of the reinforcing member body 181 is joined to the front face of the dash panel 12 at its lower end and joined to a lower front wall portion 131b of the cowl box 13, which will be described later, at its upper end, as shown in FIGS. 3 and 4.

The flat-plate portion 182 is a roughly flat-plate-shaped member which covers a portion which is enclosed by the right-and-left leg portions 181a and the bridge portion 181b of the reinforcing member body 181, which is joined to the front face of the dash panel 12. Herein, an upper end of the member gate-shaped portion 17a of the dash cross member 17 is joined to a front face of a lower portion of the flat-plate portion 182.

Moreover, as shown in FIGS. 3 and 4, the flat-plate portion 182 is provided with two beads 182a, which are configured to protrude forwardly and extend in the vehicle width direction at respective positions spaced apart from in the vehicle vertical direction. Herein, the two beads 182a are configured such that both ends, in the vehicle width direction, thereof connect to the right-and-left leg portions 181a. In other words, the two beads 182a are formed at the dash-panel reinforcing member 18 as connection portions to connect the right-and-left leg portions 181a of the reinforcing member body 181 at the positions spaced apart from in the vehicle vertical direction.

The cowl box 13 is configured in a roughly arc shape, in the plan view, such that a roughly central portion, in the vehicle width direction, thereof protrudes forwardly, and interconnects the right-and-left hinge pillars 9 in the vehicle width direction and is joined to an upper end of the dash panel 12 as shown in FIGS. 1 and 2.

The cowl box 13 comprises, as shown in FIG. 4, a cowl lower 131 which is joined to the upper end of the dash panel 12 and a cowl upper 132 which covers over the cowl lower 131, which is configured to have a closed cross section substantially extending in the vehicle width direction.

More specifically, the cowl lower 131 comprises, as shown in FIG. 4, a lower front edge portion 131a which has a specified thickness in the vehicle vertical direction, a lower front wall portion 131b which extends rearwardly and downwardly from the lower front edge portion 131a, a cowl bottom portion 131c which extends rearwardly from a lower end of the lower front wall portion 131b, and a lower rear edge portion 131d which extends rearwardly and upwardly from the cowl bottom portion 131c slightly and then extends rearwardly, which are integrally formed.

Meanwhile, the cowl upper 132 comprises, as shown in FIG. 4, an upper front edge portion 132a which is of a roughly flat-plate shape and has a specified thickness in the vehicle vertical direction, an upper front wall portion 132b which extends upwardly from a rear end of the upper front edge portion 132a slightly and then extends rearwardly and upwardly, a cowl top-plate portion 132c which extends rearwardly from an upper end of the upper front wall portion 132b, an upper rear wall portion 132d which extends rearwardly and downwardly from a rear end of the cowl top-plate portion 132c, and an upper rear edge portion 132e which extends rearwardly from a lower end of the upper rear wall portion 132d, which are integrally formed.

As shown in FIG. 4, the cowl box 13 is configured such that the lower front edge portion 131a and the upper front edge portion 132a are joined and the lower rear edge portion 131d and the upper rear edge portion 132e are joined, whereby the cowl box 13 is configured to have a closed cross section extending in the vehicle width direction.

As shown in FIGS. 1, 2 and 7, the instrument panel member 14 is of a roughly cylindrical shape having specified inner and outer diameters, and interconnects respective upper portions of the hinge pillars 9 at a position which is spaced rearwardly apart from the cowl box 13. This instrument panel member 14 is provided as a support member to support a steering shaft, onboard devises of the vehicle 1, or wire harnesses electrically connecting the onboard devises, for example, specific illustration of which is omitted.

As shown in FIGS. 1 and 2, the right-and-left front side frames 3 are arranged on the inward side, in the vehicle width direction, of the hinge pillars 9 and on the outward side, in the vehicle width direction, of the floor tunnel 10a in the plan view, and their rear ends are joined to the respective front ends of the floor frames 11.

More specifically, the front side frame 3 comprises a front side frame inner which is arranged on the inward side in the vehicle width direction and a front side frame outer which is arranged on the outward side, in the vehicle width direction, of the front side frame inner, which is configured to have a closed cross section extending in the vehicle longitudinal direction, specific illustration of which is omitted.

For example, the front side frame 3 is formed by the front pillar inner which is configured to protrude inward in the vehicle width direction so as to have a roughly hat-shaped cross section and the front pillar outer which is configured to protrude outward in the vehicle width direction so as to have a roughly hat-shaped cross section, which are contacted and joined together in the vehicle width direction. Thus, the front side frame 3 is configured to have the closed cross section extending in the vehicle longitudinal direction.

As shown in FIG. 2, a rear end of the front side frame 3 is joined to a front end of the floor frame 11 and a portion of the member horizontal portion 17b of the dash cross member 17 which is positioned in the vicinity of an inward-side end portion, in the vehicle width direction, of the member horizontal portion 17b. Herein, a crash can, not illustrated, is connected to a front end of the front side frame 3.

Further, as shown in FIGS. 1 and 2, the right-and-left apron reinforcements 4 are arranged at a position which is located on the outward side, in the vehicle width direction, of and above the front side frames 3. More specifically, each of the apron reinforcements 4 is configured to extend forwardly and slightly inwardly in the vehicle width direction from an upper end of the hinge pillar 9.

Each of the right-and-left suspension towers 5 is, as shown in FIGS. 1 and 2, configured to support an upper end of a front suspension damper (not illustrated) of a front suspension at a desired position which is spaced forwardly apart from the dash panel 12.

More specifically, as shown in FIG. 2, the suspension tower 5 comprises a tower upper face portion 5a which is provided with an insertion opening where the upper end of the suspension damper is inserted, a tower side wall portion 5b which extends downwardly from an inward side, in the vehicle width direction, of the tower upper face portion 5a, and a tower rear face portion which extends downwardly from a rear end of the tower upper face portion 5a, which are integrally formed. The suspension tower 5 is joined to the front side frame 3 at a lower end of the toward side wall portion 5b thereof, and joined to the apron reinforcement 4 at an outward-side edge end of the tower upper face portion 5a thereof.

Each of the right-and-left heat-insulating members 6 is a structural body for creating a heat-insulating space S for heat retaining or heat insulating between the dash panel 12 and each of the right-and-left suspension towers 5, as shown in FIGS. 1 and 3. This heat-insulating member 6 comprises, as shown in FIG. 3, a heat-insulating member outer 61 which is arranged on the outer side in the vehicle width direction and a heat-insulating member inner 62 which is arranged on the inward side, in the vehicle width direction, of the heat-insulating member outer 61 and connects the suspension tower 5 and the dash panel 12.

The heat-insulating member outer 61 is a member where an onboard battery or the like are fixedly placed, which is configured to have a roughly L-shaped cross section extending in the vehicle longitudinal direction as shown in FIGS. 1 and 3.

More specifically, as shown in FIG. 3, the heat-insulating member outer 61 is of a roughly flat-plate shape, having a specified thickness in the vehicle vertical direction, which comprises an outer bottom portion 61a which is joined to an upper face of the front side frame 3 and an outer side wall portion 61b which extends upwardly from an outward side, in the vehicle width direction, of the outer bottom portion 61a and is joined to the hinge pillar inner 9a of the hinge pillar 9, which are integrally formed.

Each of the heat-insulating member inners 62 comprises a heat-insulating inner upper portion 621 which constitutes an upper portion of the heat-insulating member inner 62 and a heat-insulating inner lower portion 622 which constitutes a lower portion of the heat-insulating member inner 62, as shown in FIGS. 1 through 3.

As shown in FIGS. 1 and 2, the heat-insulating inner upper portion 621 connects an upper portion of the suspension tower 5 and a front face of the dash panel 12 which is positioned on the inward side, in the vehicle width direction, of the suspension tower 5 (i.e., the dash-panel reinforcing member 18) in the plan view. This heat-insulating inner upper portion 621 is configured to have a roughly U-shaped open cross section which is opened to the outward side in the vehicle width direction and extends in the vehicle longitudinal direction, as shown in FIGS. 3 and 5.

More specifically, as shown in FIGS. 3 and 5, the heat-insulating inner upper portion 621 has a specified thickness in the vehicle vertical direction, and comprises an upper face portion 621a which constitutes an upper face portion of the heat-insulating inner upper portion 621, a side wall portion 621b which extends downwardly from an inward side, in the vehicle width direction, of the upper face portion 621a, and a lower face portion 621c which extends outwardly in the vehicle width direction from a lower end of the side wall portion 621b, which are integrally formed.

Herein, the heat-insulating inner upper portion 621 is configured such that a portion thereof which is positioned in the vicinity of a rear end thereof is bent inwardly and a shape of this portion matches an outer shape of the reinforcing member body 181 of the dash-panel reinforcing member 18. As shown in FIG. 6, the heat-insulating inner upper portion 621 is arranged such that a rear end of the side wall portion 621b is positioned on the inward side, in the vehicle width direction, of a front end of the side wall portion 621b in the plan view.

That is, the heat-insulating inner upper portion 621 is arranged such that its inward-side edge side slants rearwardly and inwardly in the plan view. As shown in FIGS. 3 and 7, the heat-insulating inner upper portion 621 is joined to the suspension tower 5 at its front end and joined to an upper portion of the leg portion 181a of the dash-panel reinforcing member 18 at its bent portion positioned in the vicinity of its rear end. In other words, the heat-insulating inner upper portion 621 is connected to the dash panel body 15 via the dash-panel reinforcing member 18.

Meanwhile, as shown in FIGS. 1 and 2, the heat-insulating inner lower portion 622 connects a lower portion of the suspension tower 5 and a portion of the dash panel body 1 which is positioned on the outward side, in the vehicle width direction, of the dash-panel reinforcing member 18, and connects the lower portion of the suspension tower 5 and the rear end of the front side frame 3.

In FIG. 3, while the right-side heat-insulating inner lower portion 622 is configured to be different from the left-side heat-insulating inner lower portion 622 in its shape, the present embodiment will be described referring to the left-side heat-insulating inner lower portion 622 as the member having substantially the same shape.

More specifically, as shown in FIGS. 3 and 5, the heat-insulating inner lower portion 622 has a specified thickness in the vehicle vertical direction, which comprises an upper face portion 622a which constitutes an upper face portion of the heat-insulating inner lower portion 622, a side wall portion 622b which extends toward an upper face of the front side frame 3 from an outward side, in the vehicle width direction, of the upper face portion 622a, and a lower end portion 622c which extends further downwardly from a lower end of the side wall portion 622b along an inward-side side face, in the vehicle width direction, of the front side frame 3, which are integrally formed.

The heat-insulating inner lower portion 622 is, as shown in FIG. 2, provided with a flange-shaped portion which extends upwardly and outwardly from a rear end of the upper face portion 622a and a rear end of the side wall portion 622b. This flange-shaped portion of the heat-insulating inner lower portion 622 is joined to the front face of the dash panel body 15.

The lower end portion 622c of the heat-insulating inner lower portion 622 is, as shown in FIGS. 3 and 5, configured to be curved over a range from a front face of the member horizontal portion 17b of the dash cross member 17 to an inward-side side face, in the vehicle width direction, of the front side frame 3. This lower end portion 622c of the heat-insulating inner lower portion 622 is joined to both of the dash cross member 17 and the front side frame 3.

In addition, at the lower end portion 622c of the heat-insulating inner lower portion 622 is formed a protrusion portion 622d which protrudes inwardly in a roughly triangular shape in the plan view, straddling a joint point of the dash cross member 17 and the front side frame 3, as shown in FIGS. 2, 3 and 5. Thereby, the protrusion portion 622d of the heat-insulating inner lower portion 622 is configured to form a closed cross section together with the dash cross member 17 and the front side frame 3.

As shown in FIGS. 6 and 7, the front vehicle body of the vehicle 1 comprises a pair of right-and-left instrument panel connecting members 19 which connect the cowl box 13 and the instrument panel member 14 and a pair of connection assist members 20 which are arranged inside the cowl box 13.

Each of the right-and-left instrument panel connecting members 19 comprises, as shown in FIGS. 6 and 7, a connection upper face portion 19a which constitutes an upper face portion of the instrument panel connecting member 19 and right-and-left connection side face portions 19b which respectively extend downwardly from both ends, in the vehicle width direction, of the connection upper face portion 19a, which is configured to have a roughly gate-shaped cross section extending in the vehicle longitudinal direction. Herein, the connection upper face portion 19a of the instrument panel connecting member 19 is configured such that a portion thereof which is positioned in the vicinity of its front end is contactable at a lower face of the cowl box 13 and its rear end is contactable at an upper portion of the instrument panel member 14.

Meanwhile, each of the connection side face portions 19b of the instrument panel connecting member 19 is configured as show in FIG. 7 such that an upper portion of a front end of a roughly triangular-shaped flat plate, in the side view, extends forwardly. Further, a rear end of the connection side face portions 19b of the instrument panel connecting member 19 is configured to have a shape which matches a periphery of the instrument panel member 14.

As shown in FIGS. 6 and 7, the instrument panel connecting member 19 is arranged such that its front end is located substantially at the same position, in the vehicle width direction, as a rear end of the heat-insulating inner upper portion 621 of the heat-insulating member inner 62 and also substantially at the same level as the heat-insulating inner upper portion 621 of the heat-insulating member inner 62. In other words, the front end of the heat-insulating member inner 62 is provided to face the rear end of the heat-insulating inner upper portion 621 of the heat-insulating member inner 62 with a specified gap (distance) in the vehicle longitudinal direction, interposing the dash panel 12 therebetween.

Further, the rear portion of the instrument panel connecting member 19 is joined to an outer peripheral face of the instrument panel member 14, and the portion of the connection upper face portion 19a of the instrument panel connecting member 19 which is positioned in the vicinity of the front end of the connection upper face portion 19a is joined to the cowl bottom portion 131c and the lower rear edge portion 131d of the cowl box 13 from a vehicle downward side. That is, the instrument panel connecting member 19 is connected to the dash panel 12 via the cowl box 13.

Meanwhile, as shown in FIGS. 6 and 7, each of the right-and-left connection support members 20 is a roughly cylindrical body which extends in the vehicle longitudinal direction, and joined to inner faces of the cowl box 13 which face each other in the vehicle longitudinal direction, i.e., the lower front wall portion 131b of the cowl lower 131 and the upper rear wall portion 132d of the cowl upper 132.

More specifically, the connection assist member 20 is configured as shown in FIGS. 6 and 7 such that its front end is joined to the lower front wall portion 131b of the cowl lower 131 substantially at the same position, in the vehicle width direction, as a rear end of the heat-insulating inner upper portion 621 of the heat-insulating member inner 62 and its rear end is joined to the upper rear wall portion 132d of the cowl upper 132 substantially at the same position, in the vehicle width direction, as a front end of the instrument panel connecting member 19.

As described above, in the front vehicle-body structure comprising the dash panel 12 constituting the partition wall which is positioned at the front side of the cabin portion 2 of the vehicle 1, a pair of right-and-left hinge pillars 9 connected to the both ends of the dash panel 12 and extending in the vehicle vertical direction, the instrument panel member 14 interconnecting the right-and-left hinge pillars 9 in the vehicle width direction in the cabin portion 2, and the suspension towers 5 provided to be spaced forwardly apart from the dash panel 12 and supporting the upper ends of the front suspension dampers, there are further provided the heat-insulating inner upper portions 621 which connect the suspension towers 5 and the dash panel 12 and the instrument panel connecting members 19 which connect the portion of the dash panel 12 which is positioned in the vicinity of the rear end of the heat-insulating inner upper portions 621 and the instrument panel member 14. Accordingly, the load energy acting on the suspension towers 5 can be efficiently dispersed and transmitted to the whole part of the vehicle body of the vehicle 1.

Specifically, since the suspension towers 5 and the dash panel 12 are connected via the heat-insulating inner upper portions 621, the front vehicle-body structure of the vehicle 1 can create the load-energy transmission paths extending from the suspension towers 5 to the right-and-left hinge pillars 9 by way of the heat-insulating inner upper portions 621, the instrument panel connecting members 19, and the instrument panel member 14 at the front vehicle body.

Further, since the rear ends of the heat-insulating inner upper portions 621 and the instrument panel member 14 are connected via the dash panel 12 and the instrument panel connecting members 19, the front vehicle-body structure of the vehicle 1 can create the load-energy transmission paths extending from the suspension towers 5 to the right-and-left hinge pillars 9 by way of the heat-insulating inner upper portions 621, the instrument panel connecting members 19, and the instrument panel member 14 at the front vehicle body.

Accordingly, the front vehicle-body structure of the vehicle 1 can disperse and transmit the load energy acting on the suspension towers 5 to the right-and-left hinge pillars 9 through the load-energy transmission paths extending by way of the dash panel 12 and the load-energy transmission paths extending by way of the instrument panel member 14.

Thereby, the front vehicle-body structure of the vehicle 1 can efficiently disperse and transmit the load energy acting on the suspension towers 5 from the right-and-left hinge pillars 9 to the rear vehicle body by way of the front pillars 8 and the side sills 7. Thus, the front vehicle-body structure of the vehicle 1 can efficiently disperse and transmit the load energy acting on the suspension towers 5 to the whole part of the vehicle body of the vehicle 1 by means of the heat-insulating inner upper portions 621 and the instrument panel connecting members 19.

Further, since the rear ends of the heat-insulating inner upper portions 621 are connected to the dash panel 12 at the positions which are located the inward side, in the vehicle width direction, of the suspension towers 5, the front vehicle-body structure of the vehicle 1 can aggressively transmit the load energy acting on the right-side suspension tower 5 to the left-side hinge pillar 9, compared to a case where the suspension towers 5 and the dash panel 12 are connected by the heat-insulating inner upper portions which are configured to extend substantially linearly along the vehicle longitudinal direction.

Likewise, the front vehicle-body structure of the vehicle 1 can aggressively transmit the load energy acting on the left-side suspension tower 5 to the right-side hinge pillar 9, compared to a case where the suspension towers 5 and the dash panel 12 are connected by the heat-insulating inner upper portions which are configured to extend substantially linearly along the vehicle longitudinal direction.

Thereby, the front vehicle-body structure of the vehicle 1 can efficiently disperse and transmit the load energy acting on the suspension tower 5 to the part of the rear vehicle body which is diagonally positioned to this suspension tower 5 where the load energy acts. Thus, the front vehicle-body structure of the vehicle 1 can more efficiently disperse and transmit the load energy acting on the suspension towers 5 to the whole part of the vehicle body of the vehicle 1 by means of the heat-insulating inner upper portions 621 which are connected to the dash panel 12 at the respective positions which are located on the inward side, in the vehicle width direction, of the suspension towers 5.

Moreover, since the front vehicle-body structure further comprises the cowl box 13 which is connected to the upper end of the dash panel 12 and interconnects the right-and-left hinge pillars 9, wherein the heat-insulating inner upper portions 621 and the instrument panel connecting members 19 are connected to the dash panel 12 via the cowl box 13, the front vehicle-body structure of the vehicle 1 can ensure the rigidity of the dash panel 12 by means of the cowl box 13, and create the load-energy transmission paths extending from the suspension towers 5 to the right-and-left hinge pillars 9 by way of the heat-insulating inner upper portions 621 and the cowl box 13.

Accordingly, the front vehicle-body structure of the vehicle 1 can disperse and transmit the load energy acting on the suspension towers 5 to the hinge pillars 9 through the load-energy transmission paths extending by way of the dash panel 12 and the load-energy transmission paths extending by way of the instrument panel member 14.

Thereby, the front vehicle-body structure of the vehicle 1 can more efficiently disperse and transmit the load energy acting on the suspension towers 5 from the right-and-left hinge pillars 9 to the rear vehicle body by way of the front pillars 8 and the side sills 7.

Thus, the front vehicle-body structure of the vehicle 1 can efficiently disperse and transmit the load energy acting on the suspension towers 5 to the whole part of the vehicle body of the vehicle 1 by means of the heat-insulating inner upper portions 621 and the instrument panel connecting members 19 which are connected to the dash panel 12 via the cowl box 13.

Also, since the connection assist members 20 which respectively connect the inner faces of the cowl box 13 which are provided to face in the vehicle longitudinal direction substantially at the same position, in the vehicle width direction, as the rear ends of the heat-insulating inner upper portions 621 and the front ends of the instrument panel connecting members 10 are provided, the front vehicle-body structure of the vehicle 1 can improve the efficiency of the load-energy transmission from the heat-insulating inner upper portions 621 to the instrument panel connecting members 10 by way of the cowl box 13, compared to a case where this connection assist members 20 is not provided. Thus, the front vehicle-body structure of the vehicle 1 can more efficiently disperse and transmit the load energy acting on the suspension towers 5 to the whole part of the vehicle body of the vehicle 1.

Additionally, since the heat-insulating inner upper portion 621 is the heat-insulating member 6 which creates the heat insulating space S between the suspension tower 5 and the dash panel 12, the front vehicle-body structure of the vehicle 1 can integrate the heat-insulating performance and the performance of transmitting the load energy acting on the suspension tower 5 to the dash panel 12 on the heat-insulating inner upper portion 621.

Thereby, the front vehicle-body structure of the vehicle 1 can suppress an increase of the number of parts at the front vehicle body, compared to a case where the heat-insulating member creating the heat-insulating space S is provided separately from the heat-insulating inner upper portion 621, and also it can be prevented that a layout space for an engine, for example, is suppressed by the above-described separately-provided heat-insulating member creating the heat-insulating space S. Thus, the front vehicle-body structure of the vehicle 1 can efficiently disperse and transmit the load energy acting on the suspension tower 5 to the whole part of the vehicle body of the vehicle 1 and also easily create the heat-insulating space S, suppressing a weight increase.

In correspondence of the present invention to the above-described embodiment, the first connecting member of the present invention corresponds to the heat-insulating inner upper portion 621 of the heat-insulating member 6 of the embodiment. Likewise, the second connecting member corresponds to the instrument panel connecting member 19, the third connecting member corresponds to the connection assist member 20, and the member which creates the heat insulating space corresponds to the heat-insulating member 6. The present invention should not be limited to the above-described embodiment and any other modifications or improvements may be applied within the scope of a spirit of the present invention.

For example, while the above-described embodiment comprises the dash panel body 15 having the tunnel-matching portion 15a, this dash panel body may not have the tunnel-matching portion 15a because the floor panel 10 is configured not to have the floor tunnel 10a. In this case, the dash cross member 17 is configured not to have the member gate-shaped portion 17a, either.

Further, while the cowl box 13 is configured to have the closed cross section extending in the vehicle width direction which is formed by the cowl lower 131 and the cowl upper 132 in the above-described embodiment, the cross section of the cowl box 13 may be an open cross section opened upwardly, for example, as long as this open cross section includes its inner faces where the front end and the rear end of the connection assist member 20 are joined.

Also, while the dash-panel reinforcing member 18 is of the roughly gate shape in the elevational view, this member may be configured to have a roughly inverse-U shape, a roughly inverse-V shape, or a roughly M shape in the elevational view. Further, while the heat-insulating member inner 62 of the heat-insulating member 6 comprises the upper portion 621 and the lower portion 622 which are formed separately from each other, this member 62 may be configured to be integrally formed by the heat-insulating inner upper portion 621 and the heat-insulating inner lower portion 622.

Additionally, while the instrument panel member 14 of the above-described embodiment is of the roughly cylindrical shape extending in the vehicle width direction, the instrument panel member may be configured such that its left-side part and its right-side part are offset in the vehicle longitudinal direction.

Figure 8:
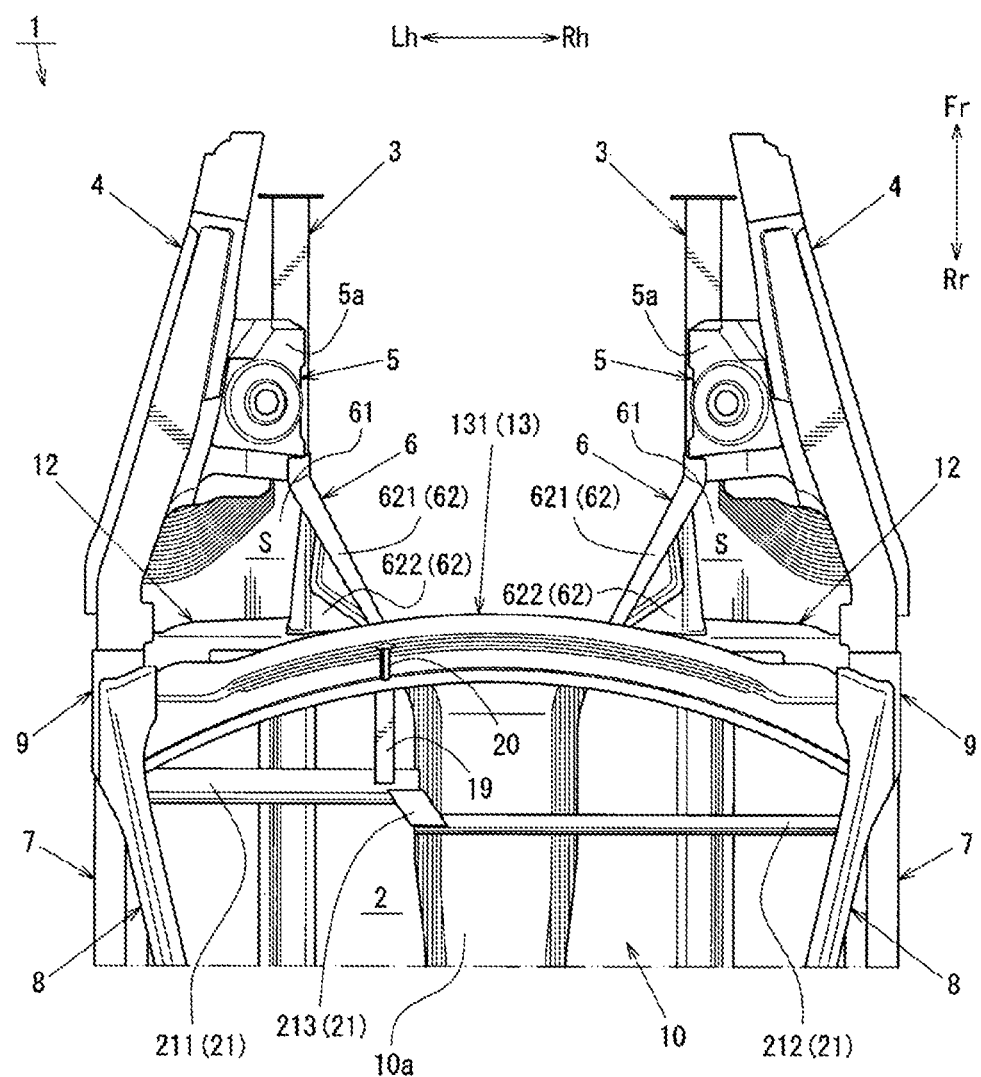
FIG. 8 is a plan view showing a front vehicle body of a vehicle according to another embodiment.

More specifically, as shown in FIG. 8 which is a plan view of a front vehicle body of the vehicle 1 according to another embodiment, the instrument panel member 21 which interconnects the right-and-left hinge pillars 9 may comprise a left cylindrical portion 211 which is of a roughly cylindrical shape and joined to the left-side hinge pillar 9 at a left end thereof, a right cylindrical portion 212 which is of a roughly cylindrical shape, offset rearwardly from the left cylindrical portion 211, and joined to the right-side hinge pillar 9 at a right end thereof, and a connecting member 213 which connects a right end of the left cylindrical portion 211 and a left end of the right cylindrical portion 212.

Further, while a pair of right-and-left instrument panel connecting members 19 and a pair of right-and-left connection assist member 20 are provided, these members 19, 20 may be provided only at either one side of the vehicle right-and-left sides because of a layout restriction of the cabin portion 2 as shown in FIG. 8.

Figure 9:
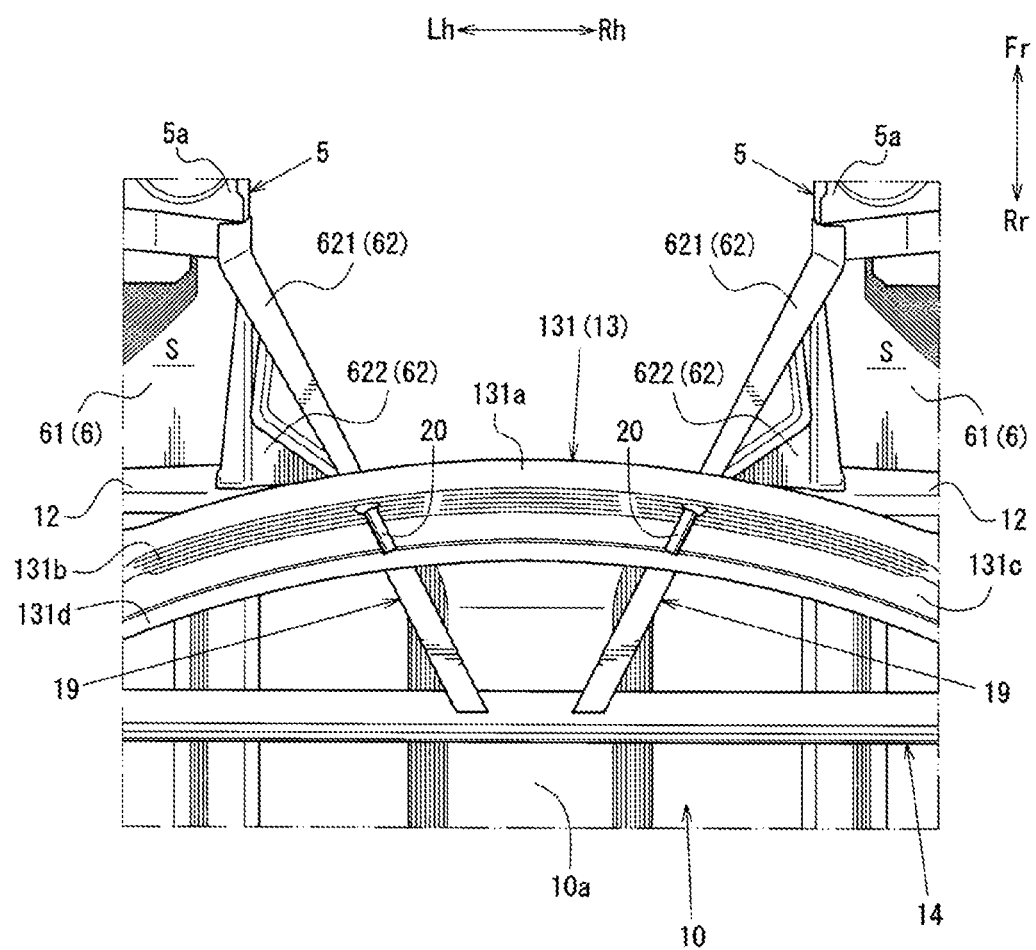
FIG. 9 is a plan view showing a major part of the front vehicle body according to further another embodiment.

Moreover, while the instrument panel connecting member 19 and the connection assist member 20 are provided to extend in the vehicle longitudinal direction relative to the heat-insulating inner upper portion 621 of the heat-insulating member inner 62 which extends inwardly and rearwardly from the vehicle outward side in the plan view, these members 19, 20 may be oblique relative to the vehicle longitudinal direction so as to extend along an extensional line of the heat-insulating inner upper portion 621 extending inwardly and rearwardly from the vehicle outward side in the plan view, as shown in FIG. 9 which is a plan view of a front vehicle body according to further another embodiment.

Even in this case, the front vehicle-body structure of the vehicle can aggressively transmit the load energy acting on the left-side suspension tower 5 to the right-side hinge pillar 9 by way of the dash panel 12 and the instrument panel member 14 as well, for example.

What is claimed is:

1. A front vehicle-body structure of a vehicle, comprising:
a dash panel constituting a partition wall which is positioned at a front side of a cabin portion of the vehicle;
a pair of right-and-left hinge pillars connected to both ends of the dash panel and extending in a vehicle vertical direction;
an instrument panel member interconnecting the right-and-left hinge pillars in a vehicle width direction in the cabin portion;
a suspension tower provided to be spaced forwardly apart from the dash panel and supporting an upper end of a front suspension damper;
a first connecting member connecting the suspension tower and the dash panel; and
a second connecting member connecting a portion of the dash panel which is positioned in the vicinity of a rear end of the first connecting member and the instrument panel member.

2. The front vehicle-body structure of the vehicle of claim 1, wherein the rear end of said first connecting member is connected to said dash panel at a position which is located on an inward side, in the vehicle width direction, of said suspension tower.

3. The front vehicle-body structure of the vehicle of claim 1, further comprising a cowl box which is connected to an upper end of said dash panel and interconnecting said right-and-left hinge pillars, wherein said first connecting member and said second connecting member are connected to said dash panel via said cowl box.

4. The front vehicle-body structure of the vehicle of claim 2, further comprising a cowl box which is connected to an upper end of said dash panel and interconnecting said right-and-left hinge pillars, wherein said first connecting member and said second connecting member are connected to said dash panel via said cowl box.

5. The front vehicle-body structure of the vehicle of claim 3, wherein said cowl box is configured to have a closed cross section or an open cross section which extend in the vehicle width direction, and the front vehicle-body structure further comprises a third connecting member which connects a pair of inner faces of said cowl box which are provided to face in a vehicle longitudinal direction substantially at the same position, in the vehicle width direction, as the rear end of said first connecting member and a front end of said second connecting member.

6. The front vehicle-body structure of the vehicle of claim 4, wherein said cowl box is configured to have a closed cross section or an open cross section which extend in the vehicle width direction, and the front vehicle-body structure further comprises a third connecting member which connects a pair of inner faces of said cowl box which are provided to face in a vehicle longitudinal direction substantially at the same position, in the vehicle width direction, as the rear end of said first connecting member and a front end of said second connecting member.

7. The front vehicle-body structure of the vehicle of claim 1, wherein said first connecting member is a member which creates a heat insulating space between said suspension tower and said dash panel.

8. The front vehicle-body structure of the vehicle of claim 2, wherein said first connecting member is a member which creates a heat insulating space between said suspension tower and said dash panel.

9. The front vehicle-body structure of the vehicle of claim 3, wherein said first connecting member is a member which creates a heat insulating space between said suspension tower and said dash panel.

10. The front vehicle-body structure of the vehicle of claim 4, wherein said first connecting member is a member which creates a heat insulating space between said suspension tower and said dash panel.

11. The front vehicle-body structure of the vehicle of claim 5, wherein said first connecting member is a member which creates a heat insulating space between said suspension tower and said dash panel.

12. The front vehicle-body structure of the vehicle of claim 6, wherein said first connecting member is a member which creates a heat insulating space between said suspension tower and said dash panel.

\* \* \* \* \*